Dec. 31, 1940.  E. A. EWELL  2,226,757
TIRE TOOL
Filed April 4, 1939
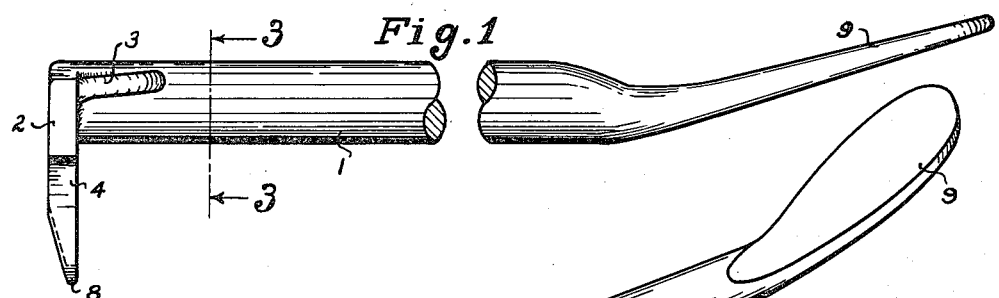
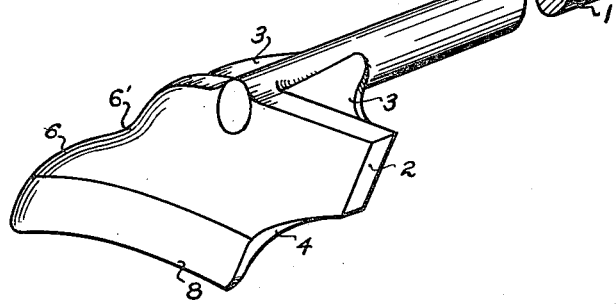
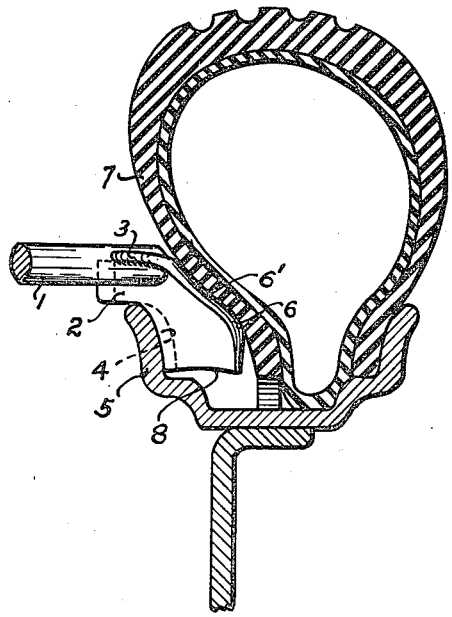
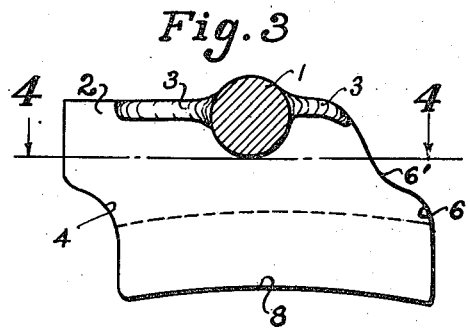
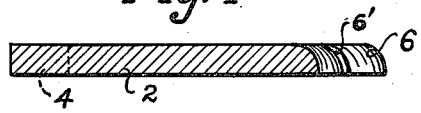
Elvin A. Ewell
INVENTOR.
ATTORNEY.

Patented Dec. 31, 1940

2,226,757

UNITED STATES PATENT OFFICE 2,226,757

TIRE TOOL

Elvin A. Ewell, Bellevue, Tex., assignor of thirty-five one-hundredths to Reba Jane Wimberley, Burkburnett, Tex.

Application April 4, 1939, Serial No. 266,004

1 Claim. (Cl. 157—6)

This invention relates to improvements in tire tools of the character utilized both in breaking the casing away from the rim when the casing adheres thereto and to remove the casing from the rim.

The object of this invention is to simplify the construction of such a tool, and to render it easy and positive in operation in removing the casings from vehicle rims.

Tools that have been in use heretofore have lacked the facility of easy and quick disengagement of the casing from the rim to which it may have adhered.

While the drawing illustrates a preferred embodiment of the invention, it is to be understood that minor changes may be made in the shape of the tool to fit different contours of rims and side walls of casings, without departing from the scope of the invention as claimed.

In the accompanying drawing:

Fig. 1 is a side elevation of the tire tool;

Fig. 2 is a perspective view thereof;

Fig. 3 is a transverse section on the line 3—3 of Fig. 1;

Fig. 4 is a longitudinal section through the blade on the line 4—4 of Fig. 3; and Fig. 5 is a fragmentary section through a tire casing and rim of an automobile wheel, showing the tool positioned so as to move the casing away from the rim to the center or drop portion of the rim.

With more detailed reference to the drawing, the numeral 1 represents a handle to one end of which is affixed a blade or pry member 2 at right angles thereto. This blade either may be made integral with the handle 1 or secured thereto, and has ribs 3 between the blade and handle to reinforce the blade.

The blade 2 has a recessed portion or notch 4 at the free edge thereof and at one end for engagement with the side flange of a rim 5. The edges of this notch 4 are preferably sharp so they will engage the rim 5 without slipping. The contour of this notch conforms, preferably, to the inner contour of the rim 5.

A shoulder 6 is formed on the opposite end of the blade 2 by a notch 6' diagonally from the notch 4 and disposed at the back edge of the blade, and the shoulder 6 has the edge thereof contoured to fit the side wall of a tire casing 7. The shoulder 6 is rounded off along its forward edge, as shown in Fig. 4, to permit the tool to slide along the side wall of the tire casing 7, so that it will not injure the rubber or the fabric of the casing.

The free edge of the blade 2 is sharpened or wedge-shaped at 8 so as to permit easy insertion of the blade between the casing 7 and the rim 5. After thus inserting the sharpened edge between the casing and rim, the handle should be swung toward the rim, pivoting the tool on the notched edge 4 and moving it sidewise, as best seen in Fig. 5. The rounded portion of edge 6 will contact and slip on the casing 7 while the sharp edge portion of the notch 4 will engage the rim, causing the casing to be pressed toward the center of the rim and loosened therefrom. The handle is of such length as to exert a great leverage on the comparatively short blade 2.

The free edge designated 8 is preferably curved longitudinally in an arc corresponding with the curvature of the periphery of the rim 5, so that said blade may be inserted into full contact with the rim throughout the length of said blade.

The opposite end of the handle is flattened, as at 9 to permit insertion beneath the casing for removal of the casing from the rim, after the edges of the casing have been loosened from the rim by the blade 2.

I claim:

A tire tool comprising a substantially flat blade having a handle attached to one edge portion thereof with the opposite edge portion adapted for insertion between a tire and rim, said blade having a concave notch at one end of the last-mentioned edge portion extending from said edge toward the opposite edge and adjacent end of the blade, the opposite end of the blade having a curved notch diagonally disposed from the first-mentioned notch with a convex shoulder between said curved notch and the free edge of the blade for engaging the tire when said concave notch engages the rim and conforming respectively substantially thereto.

ELVIN A. EWELL.